No. 12,116. REISSUED JUNE 9, 1903.

D. BINNS.

CORN HARVESTER.

APPLICATION FILED FEB. 2, 1903.

4 SHEETS—SHEET 1.

Witnesses

Ralph A. Shepard

H. G. Shepard

David Binns Inventor

By

D. C. Shepherd

Attorney

No. 12,116. REISSUED JUNE 9, 1903.

D. BINNS.

CORN HARVESTER.

APPLICATION FILED FEB. 2, 1903.

4 SHEETS—SHEET 2.

Witnesses

Ralph A. Shepard

H. E. Shepard

David Binns Inventor

By

D. C. Shepherd

Attorney

No. 12,116. REISSUED JUNE 9, 1903.

D. BINNS.

CORN HARVESTER.

APPLICATION FILED FEB. 2, 1903.

4 SHEETS—SHEET 3.

Witnesses

Ralph A. Shepard

Geo. Shepard

David Binns Inventor

By

C. C. Shepherd

Attorney

No. 12,116. REISSUED JUNE 9, 1903.

D. BINNS.

CORN HARVESTER.

APPLICATION FILED FEB. 2, 1903.

4 SHEETS—SHEET 4.

Witnesses

Ralph A. Shepard

H. J. Shepard

David Binns Inventor

By

D. C. Shepherd

Attorney

No. 12,116.

Reissued June 9, 1903.

UNITED STATES PATENT OFFICE.

DAVID BINNS, OF CAMPCHASE, OHIO, ASSIGNOR OF ONE-FOURTH TO CHARLES S. BINNS, OF COLUMBUS, OHIO.

CORN-HARVESTER.

SPECIFICATION forming part of Reissued Letters Patent No. 12,116, dated June 9, 1903.

Original No. 677,927, dated July 9, 1901. Application for reissue filed February 2, 1903. Serial No. 141,617.

*To all whom it may concern:*

Be it known that I, DAVID BINNS, a citizen of the United States, residing at Campchase, in the county of Franklin and State of Ohio, have invented a certain new and useful Improvement in Corn-Harvesters, of which the following is a specification.

This invention relates to harvesting-machines, and has for its object to provide an improved machine of this character wherein the stalks are cut off close to the ground and then delivered rearwardly from the cutting apparatus to the ground in standing bundles or shocks. It is furthermore designed to have the machine operate simultaneously upon two rows of standing corn and in this connection to provide for maintaining the stalks cut from one row separate from those cut from the other row when the same are being delivered from the cutting apparatus.

Another object is to prevent choking of one part of the delivery apparatus by stalks upon another part thereof.

A still further object of the invention is to provide for driving the delivery apparatus at different rates of speed, to have the speed-controlling means in position for convenient manipulation by the driver of the machine, and also to have said speed-controlling means housed and protected from the cut stalks when they are being delivered from the cutting apparatus.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
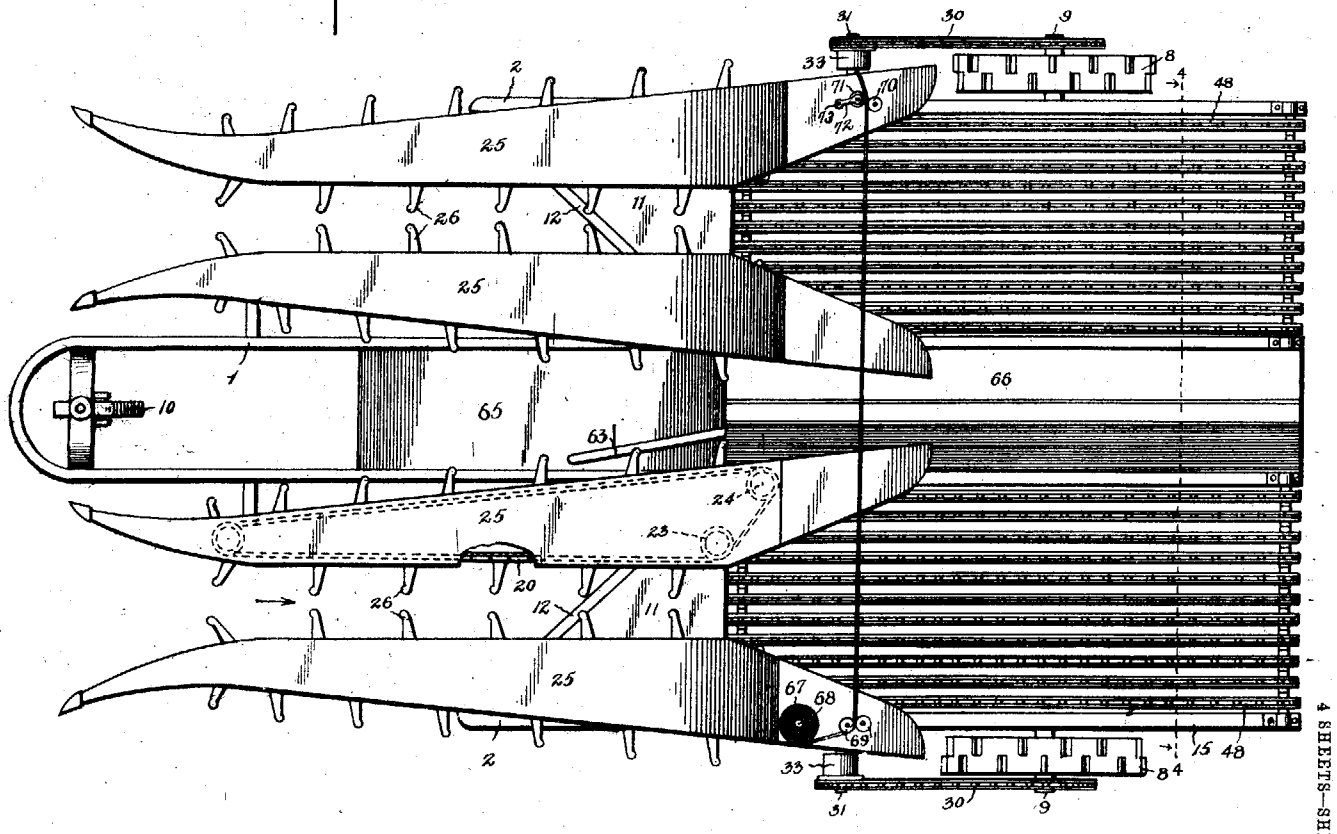
Figure 2:
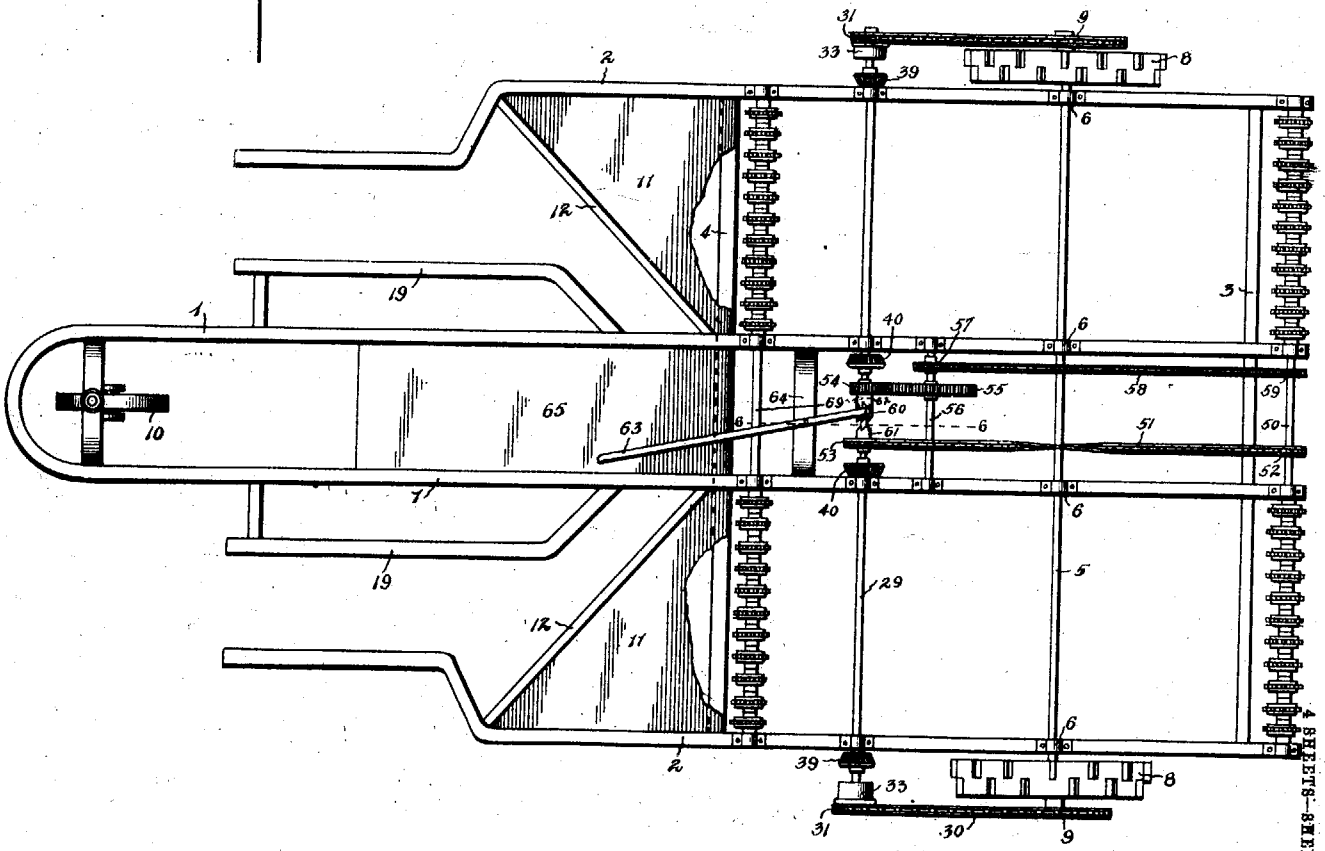
Figure 3:
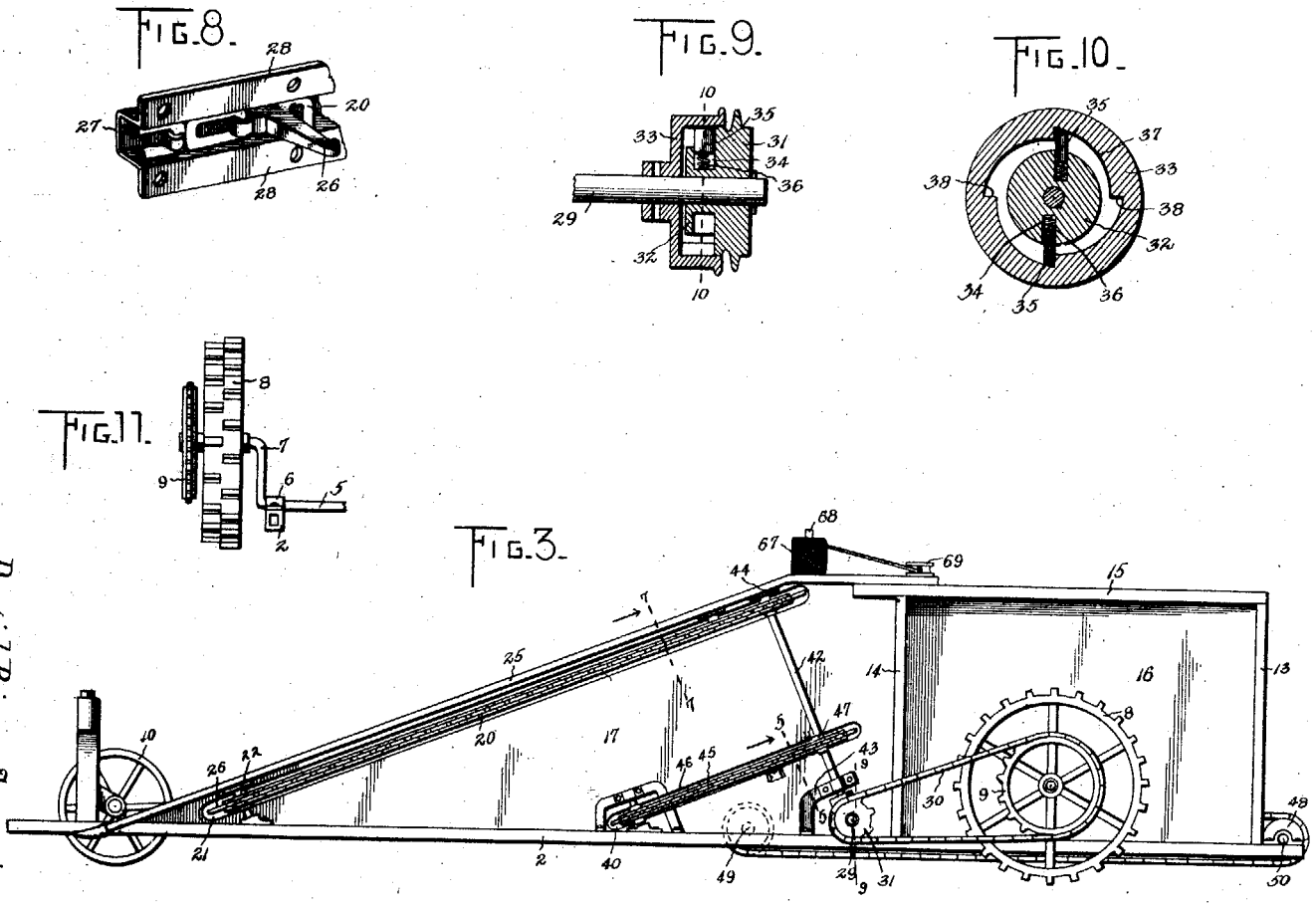
Figure 4:
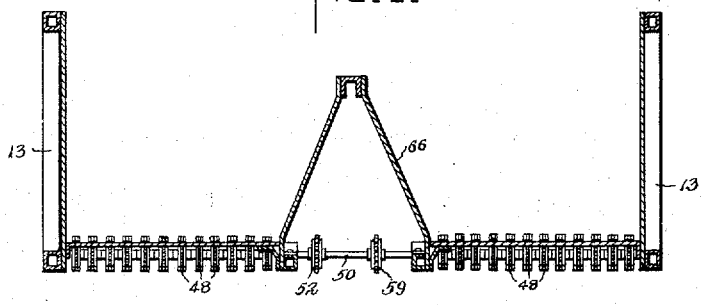
Figure 5:
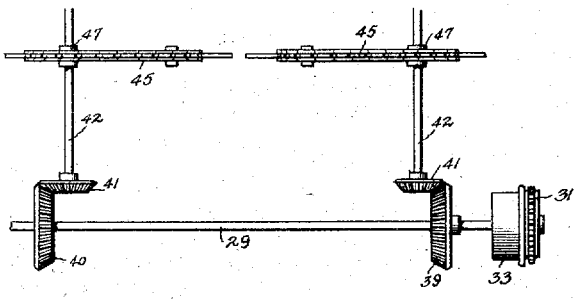
Figure 6:
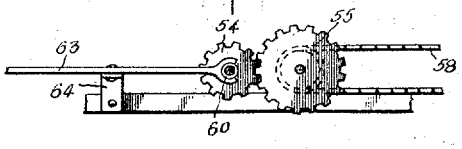
Figure 7:
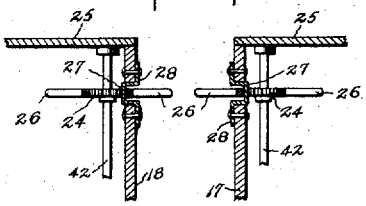

In the drawings, Figure 1 is a plan view of a corn-harvesting machine constructed and arranged in accordance with the present invention. Fig. 2 is a similar view, portions of the frame being omitted to disclose the drive connections between the supporting-wheels of the machine and the delivery apparatus. Fig. 3 is a side elevation of the machine. Fig. 4 is a detail cross-sectional view taken on the line 4 4 of Fig. 1. Fig. 5 is an enlarged detail sectional view taken on the line 5 5 of Fig. 3. Fig. 6 is a detail sectional view taken on the line 6 6 of Fig. 2. Fig. 7 is a detail sectional view taken on the line 7 7 of Fig. 3. Fig. 8 is a detail perspective view showing the manner of housing the feed-chains. Fig. 9 is a detail sectional view taken on the line 9 9 of Fig. 3. Fig. 10 is a sectional view taken on the line 10 10 of Fig. 9, and Fig. 11 is a detail edge elevation of one of the ground or supporting wheels to show the terminal shape of the main axle.

Like characters of reference designate corresponding parts in all of the figures of the drawings.

The main frame of the present machine, as best indicated in Fig. 2 of the drawings, is made up of a pair of substantially parallel, longitudinal, and central or inner sills or bars 1 and opposite parallel outer side bars or sills 2, these bars being connected by rear and intermediate cross-bars 3 and 4, respectively. Between the cross-bars is a main supporting-axle 5, which is mounted in suitable boxes 6 upon the longitudinal sills and has each end, as shown in Fig. 11, bent upwardly and then outwardly to form an upstanding angular hanger 7, the upper and horizontal member of which forms a spindle for the adjacent ground-wheel 8, and to the outer side of this ground-wheel a sprocket-wheel 9 is rigidly connected thereto for simultaneous rotation therewith. Between the forward ends of the inner sills 1 there is a caster-wheel 10 for the support of the front end of the frame. It will be understood that the axle 5 is depressed or hung below the spindles in order that the main frame may lie as low as possible to the ground.

For cutting the standing stalks close to the ground there is provided a cutting apparatus at opposite sides of the center sills 1, consisting of a substantially horizontal table or platform 11, supported upon the cross-bar 4 and the adjacent sills 1 and 2, with its front edge inclined rearwardly and toward the center of the machine and provided with a rigid cutting blade or knife 12, correspondingly inclined and adapted to sever the cornstalks with a drawing or shear-like action when the machine is driven along the rows of corn.

By reference to Fig. 3 of the drawings it will be seen that rear and intermediate standards 13 and 14 rise from the outer sills 2 and are connected at their upper ends by means of the respective longitudinal top sills 15, and to the inner sides of each of these upstanding supplemental frames is secured a side member or plate 16, and a front side plate or member 17 extends from the standard 14 to the front of the main frame, with its top edge inclined downwardly and forwardly. It will be understood that there are no supplemental frames rising from the rear portions of the center sills 1; but an inner side member 18, a portion of which is shown in Fig. 7, is supported by the front portion of each of the center sills 1, preferably upon a supplemental sill 19, carried by the outer side of the adjacent center sill, as best shown in Fig. 2 of the drawings.

It will be understood that the sides or partitions 17 and 18 lie on opposite sides of a row of standing corn, and thereby form a guideway to direct the corn to the cutting apparatus or knives. In this guideway is a feed device to direct the stalks to the adjacent knife-blade 12, consisting of a pair of endless sprocket-chains 20, each of which works through a longitudinal slot 21, formed in the adjacent partition 17 or 18 and disposed substantially parallel with the upper inclined edge of the partition and also adjacent to said upper edge. At the lower end of the slot is an idle sprocket-wheel 22, over which the sprocket-chain runs, and at the upper end of the slot there are two idle sprocket-wheels 23 and 24, which are hung from the under side of a guard-plate 25, supported upon the upper edge of the adjacent partition and projected at the adjacent outer side of the guideway between the adjacent partitions. Each chain is provided with a series of laterally-directed fingers 26, which project into the guideway and work rearwardly in the direction of the arrow on Fig. 1 of the drawings. To prevent the stalks from being drawn into the slots of the partitions, and thereby choking the feed device, each of these slots may be closed throughout the greater part of its intermediate portion by means of a channel iron or plate 27, substantially U-shaped in cross-section, with its body portion disposed in the slot and receiving the inner side of the adjacent chain and provided at its opposite edges with external longitudinal flanges 28, fastened to the inner side of the adjacent partition. It will of course be understood that these channel irons or casings must terminate short of the opposite ends of the slots in order that there may be sufficient openings for the chains to pass through the partitions.

The feed-chains are driven from a main drive-shaft 29, which is journaled transversely across the main frame of the machine, and preferably disposed between the cross-bar 4 and the main axle 5. This drive-shaft has an operative connection at each end with the sprocket-wheel 9 upon the adjacent end of the axle 5, consisting of a sprocket-chain 30, running over a sprocket-wheel 31, loosely mounted upon the adjacent end of the drive-shaft 29, which is projected externally of the frame of the machine. As best indicated in Figs. 9 and 10, it will be seen that the sprocket-wheel 31 is provided upon its inner side with a reduced hub-like extension 32, that is projected into a cup 33, rigid upon the drive-shaft. The hub is provided with two or more radial sockets or recesses 34 for the reception of radially-slidable dogs 35, which are normally pressed outwardly by means of helical springs 36, disposed in the back of the sockets. As clearly shown in Fig. 10, it will be seen that the outer ends of the dogs are beveled and work in frictional engagement with the cam or eccentric portions 37 of the inner periphery of the cup, each eccentric portion terminating in an abrupt radial shoulder 38, against which the adjacent dog is adapted to engage, and thereby to interlock the sprocket and cup for simultaneous rotation in one direction, thereby to rotate the drive-shaft 29. The cam-faces 37 and the shoulders 38 are so disposed as to interlock the sprocket 31 and the cup 33 when the machine is traveling forwardly and to permit loose rotation of the sprocket upon the drive-shaft when the machine is moving rearwardly, thereby to prevent backward operation of the several parts of the machine, particularly when turning at the end of a row.

For an understanding of the operative connection between the drive-shaft and the feed-chains 20 reference is had more particularly to Figs. 3, 5, and 7 of the drawings and also Fig. 2, from the latter of which it will be seen that the drive-shaft is provided with terminal beveled gears 39, adjacent to the outer sides of the machine, and similar beveled gears 40 are carried by the drive-shaft and disposed between the longitudinal center sills 1. With each gear 39 there meshes another beveled gear 41, carried by the lower end of an upwardly and forwardly inclined counter-shaft 42, which is journaled at its lower end in a bracket 43, carried by the main frame, and journaled at its upper end in a bearing 44, carried by the under side of the adjacent guard-plate 25. It will here be noted that the sprocket-wheel 24 (best shown in Fig. 7) is carried by the upper end portion of the shaft 42, and therefore as the adjacent chain 20 meshes with said sprocket the latter forms a drive-sprocket for the former. It will of course be understood that there is a similar drive connection between each of the beveled gears 40 and the feed-chains which are adjacent thereto, as will be appreciated by reference to Fig. 5 of the drawings.

Below each main feed-chain 20 there is a supplemental shorter fingered feed-chain 45, disposed parallel with the upper chain and working through a longitudinal slot 46 in the adjacent partition, said chain being driven from a sprocket-wheel 47 upon the lower portion of the counter-shaft.

In rear of each knife 12 and communicating directly therewith is an individual delivery apparatus, consisting of a series of longitudinal conveyer-chains 48, working over corresponding sprocket-wheels upon the transverse shafts 49 and 50, mounted upon the main frame and disposed, respectively, immediately in rear of the platform 11 and at the rear extremities of the main longitudinal sills. It will be noted that these conveyer-chains are arranged in two separate and individual sets, one for each knife-blade, and disposed at opposite sides of the longitudinal center of the machine—that is to say, between each center sill 1 and the adjacent outer sill 2—whereby there is a longitudinal interspace between the individual delivery devices.

Motion is transmitted from the drive-shaft 29 to the rear shaft 50 of the delivery apparatus by two different connections, one of which consists of an endless sprocket-chain 51, which is located in the interspace between the two delivery devices and runs over a sprocket-wheel 52 upon the shaft 50 and also over the sprocket-wheel 53 upon the drive-shaft, the intermediate portion of the chain being crossed, so as to run the upper members of the delivery-chains in a rearward direction. The other connection between the drive-shaft and the delivery apparatus consists of a gear or pinion 54, loose upon the shaft 29 and between the center sills, said gear being in mesh with a larger gear 55, carried by a counter-shaft 56, journaled upon the sills 1 and in rear of the drive-shaft. Upon the counter-shaft 56 is a sprocket-wheel 57, over which runs an endless sprocket-chain 58, not crossed, which also engages a sprocket-wheel 59 upon the shaft 50. It will of course be understood that only one of these drive connections is operative at a time, and therefore the sprocket 53 and the pinion 54 are mounted to rotate loosely upon the drive-shaft 29 and may be interlocked with said shaft for simultaneous rotation therewith by means of a tubular clutch member 60, slidably embracing the drive-shaft, but keyed or otherwise connected thereto for simultaneous rotation therewith. This clutch member is mounted between the sprocket 53 and gear 54 and is provided at opposite ends with ratchet-teeth for alternate engagement with the clutch-hubs 61 and 62, respectively, of the sprocket and the gear, whereby either of these members may be interlocked with the drive-shaft to render one connection between the drive-shaft and the delivery apparatus active and the other inactive. By having the gear 55 larger than the gear 54 it will be understood that the connection including these members is arranged to drive the delivery apparatus at a less rate of speed than the other drive connection, whereby the delivery apparatus may be driven at different rates of speed for a purpose as will hereinafter be set forth.

For controlling the fast and slow speed mechanism there is provided a substantially horizontal lever 63, fulcrumed intermediately upon a cross-bar 64, extending between the sills 1, the front end portion of the lever being extended in front of the shaft 49 and working across a platform 65, carried by the center sills 1 and forming a support for the driver or other operator, who will therefore be in position for conveniently manipulating the lever to shift the clutch member 60, and thereby to change the speed of the delivery apparatus from one rate to another.

As best indicated in Figs. 1 and 4 of the drawings, it will be seen that there is an inverted substantially V-shaped hood or casing 66, supported upon the center sills 1 and extending from the rear ends thereof to or, if desired, slightly in advance of the front end of the delivery device, whereby said hood arches over or bridges the interspace between the individual delivery devices, and hence separates the stalks of the one delivery device from those of the other and also protects the speed-regulating apparatus from being choked or interfered with by the stalks. This is a very important feature of the present invention, as it effectually prevents interference of the stalks with the speed-regulating mechanism and also prevents one delivery device from interfering with the other. Furthermore, by having the delivery devices arranged in parallelism and communicating, respectively, with individual knives and with the hood or casing 66, extended to or in advance of the front ends of the delivery devices, there is no possibility of the stalks at one side of the machine interfering with the stalks or any of the mechanism at the opposite side of the machine, whereby the latter may effectually operate simultaneously upon two rows of standing stalks.

For convenience in tying the shocks or bundles upon the machine there is provided a cord-ball 67, (shown in Figs. 1 and 3,) and mounted upon a support consisting of a pin or spindle 68, rising from the top of one of the outer guard-plates 25, which is extended in rear of the counter-shaft 42 and is disposed horizontally. In rear of the cord-ball is a pair of upstanding guide-rolls 69, rising from the guard-plates and between which the cord is adapted to pass. The free portion of the cord extends transversely across the machine and has its free terminal held in a clamping device consisting of a roller 70, rising from the adjacent guard-plate 25, and a swinging roller 71, mounted upon the free rear end of a horizontally-swinging arm or link 72, which has its forward end pivoted to the guard-plate, as at 73, out of longitudinal alinement with the roller 70 and at the outer side thereof.

In the operation of the machine the latter is driven forwardly to receive a row of standing stalks between each pair of feed-chains 20, whereby the latter direct the stalks to the knives, which sever the same close to the ground, and in view of the fact that the feed-chains overlap the front ends of the delivery devices the cut stalks are carried to the delivery devices in a positive and effective manner. As the cut stalks are carried rearwardly by the delivery devices they are crowded against the cord, whereby the free end of the latter is snugly clamped between the rollers 70 and 71 and the intermediate portion of the cord is fed from the ball. When a sufficient quantity of stalks have been accumulated upon the delivery devices, the machine is stopped, the free end of the cord is drawn outwardly, so as to obtain a sufficient amount of cord to tie the stalks into a bundle or shock, after which the cord is cut and the machine is started ahead. Normally the clutch member 60 is in engagement with the gear 54, so as to deliver the cut stalks at a comparatively slow rate of speed from the knives, and thereby to prevent the stalks from being immediately discharged to the ground. When a bundle has been tied and the machine again started ahead, the driver or operator standing on the platform 65 manipulates the lever 63 to shift the clutch from the gear 54 to the sprocket 53, whereby the speed of the delivery apparatus will be increased and the bundle will be quickly discharged from the machine, after which the clutch is again shifted back into engagement with the gear 54. From this description it will be understood that the delivery apparatus is normally run at its lowest rate of speed, and the speed thereof is increased only when it is desired to quickly discharge a bundle which has been tied.

Having now fully described my invention, what I claim, and desire to secure by Letters Patent, is—

1. The combination with individual cutting devices, of substantially parallel delivery devices, each comprising an endless horizontal carrier leading rearwardly from each cutting device and separated by a longitudinal interspace, and a protecting-hood bridging said interspace and common to both delivery devices.

2. The combination with individual cutting devices, of substantially parallel delivery devices comprising endless horizontal carriers leading rearwardly from each cutting device and separated by a longitudinal interspace, a protecting-hood bridging said interspace and common to both delivery devices, and mechanism for driving the delivery devices.

3. The combination with individual cutting devices, of substantially parallel delivery devices comprising endless carriers leading rearwardly from each cutting device and separated by a longitudinal interspace, a protecting-hood bridging said interspace and common to both delivery devices and mechanism located beneath the hood and housed thereby for driving the delivery devices.

4. The combination with individual cutting devices, of substantially parallel delivery devices comprising endless carriers leading rearwardly from each cutting device and separated by a longitudinal interspace, a protecting-hood bridging said interspace and common to both delivery devices and means for driving the delivery devices at fast or slow rates of speed.

5. The combination with individual cutting devices, of substantially parallel delivery devices comprising endless carriers leading rearwardly from the cutting devices and separated by a longitudinal interspace, a protecting-hood bridging said interspace and common to both delivery devices, and means located beneath the hood and housed thereby for driving the delivery devices at fast and slow rates of speed.

6. The combination with a wheeled frame, of cutting devices located at opposite sides of the frame, individual substantially parallel delivery devices comprising endless carriers leading rearwardly from each cutting device and separated by a longitudinal interspace, a protecting-hood bridging said interspace and common to both delivery devices, and means for driving the delivery devices from the wheels of the frame, said means including mechanism for regulating the speed of the delivery devices and located beneath the hood and protected thereby.

7. The combination with individual cutting devices, of substantially parallel delivery devices comprising endless carriers leading from the cutting devices and separated by a longitudinal interspace, a drive-shaft extending transversely across said interspace, two drive connections from the drive-shaft to the delivery devices, one of said drive connections being constructed to drive the delivery apparatus at a greater rate of speed than the other connection, and a hood bridging the interspace between the delivery devices.

8. The combination with opposite cutting devices, of delivery devices comprising endless carriers leading rearwardly therefrom and separated by a longitudinal interspace, a drive-shaft disposed transversely across said interspace, two drive connections located in the interspace and leading from the drive-shaft to the delivery devices, one of said drive connections including gearing to run the same at a less rate of speed than the other connection, and a hood bridging the interspace.

9. The combination with opposite cutting devices, of individual delivery devices leading therefrom and separated by a longitudinal interspace, a drive-shaft disposed transversely across said interspace, two drive connections from the drive-shaft to the delivery devices, one of said connections including gearing to run the same at a less rate of speed than the other connection, and both connections including members loosely rotatable upon the drive-shaft and provided with ratchet-hubs, a ratchet clutch member mounted upon the drive-shaft to rotate simultaneously therewith and also slidable longitudinally upon the shaft, means to shift the clutch member into alternate engagement with the clutch-hubs, and a hood bridging the interspace and housing and protecting the drive connections and the controlling means therefor.

10. In a corn-harvester, the combination with a horizontal frame, of endless carriers arranged to travel over said horizontal frame on opposite sides of the center of the width thereof, said carriers being arranged on horizontal shafts, a flaring or inverted-V-shaped partition arranged longitudinally on said frame between said carriers, a cutting device for each of said carriers, and mechanism arranged between the carriers for driving the latter either at a fast or slow rate of speed.

11. The combination with a wheeled frame, of cutting devices, fingered feed-chains inclined upwardly, rearwardly to and beyond the cutting devices, delivery devices leading rearwardly from the cutting devices, a transverse drive-shaft in operative relation to the wheels of the frame, upwardly and forwardly inclined counter-shafts driven directly from the drive-shaft and located in rear of the forward ends of said delivery devices, the inner pair of said counter-shafts rising from the interspace between the delivery devices, sprocket-wheels upon the counter-shafts and engaging the fingered feed-chains, an operative connection between the drive-shaft and the delivery devices, and a protecting-hood bridging said interspace.

12. The combination with individual cutting devices, of substantially parallel delivery devices leading rearwardly from each cutting device and separated by a longitudinal interspace, and a protecting-hood bridging said interspace and common to both delivery devices.

13. The combination with individual cutting devices of substantially parallel delivery devices leading rearwardly from each cutting device and separated by a longitudinal interspace, a protecting-hood bridging said interspace and common to both delivery devices, and mechanism located beneath the hood and housed thereby for driving the delivery devices.

14. The combination with individual cutting devices, of substantially parallel delivery devices leading rearwardly from each cutting device and separated by a longitudinal interspace, a protecting-hood bridging said interspace and common to both delivery devices, and means located beneath the hood and housed thereby for driving the delivery devices at fast and slow rates of speed.

15. The combination with individual cutting devices, of substantially parallel delivery devices leading from the cutting devices and separated by a longitudinal interspace, a drive-shaft extending transversely across said interspace, two drive connections from the drive-shaft to the delivery devices, one of said drive connections being constructed to drive the delivery apparatus at a greater rate of speed than the other connection, means for rendering either connection active and the other inactive, and a hood bridging the interspace between the delivery devices and housing and protecting the drive connections and the controlling means therefor.

16. The combination with opposite cutting devices, of delivery devices leading rearwardly therefrom and separated by a longitudinal interspace, a drive-shaft disposed transversely across said interspace, two drive connections located in the interspace and leading from the drive-shaft to the delivery devices, one of said drive connections including gearing to run the same at a less rate of speed than the other connection, means for alternately rendering one drive connection active and the other inactive, and a hood bridging the interspace and housing and protecting the drive connection and the means for controlling the same.

17. The combination with opposite cutting devices, of individual substantially parallel delivery devices leading rearwardly from the cutting devices and separated by a longitudinal interspace, a support for an operator located between the cutting devices and in front of the delivery devices, means located in the interspace for driving the delivery devices at different rates of speed, a controlling-lever for said means, said lever being projected in front of the delivery devices and in position for manipulation from the support for the operator, and a hood bridging the interspace and housing the means for driving the delivery devices, the front of the hood being terminated short of the front end of the lever to give access to the latter.

18. The combination with a wheeled frame, having opposite longitudinal side sills, and spaced longitudinal center sills, of cutting devices located between each side sill and the adjacent center sill, a transverse drive-shaft mounted across the center sills and driven from the ground-wheels, front and rear shafts extending transversely from one side sill to the other in rear of the cutting devices, corresponding sprocket-wheels carried by said shafts and located between each side sill and the adjacent center sill, fingered conveyer-chains running over respective sprocket-wheels and forming two delivery devices which are separated by the interspace between the center sill, a drive connection located between the center sills and extending from the drive-shaft to one of the sprocket-shafts, and a hood supported upon the center sills and bridging the space therebetween, said hood forming a partition between the two delivery devices and also housing and protecting the drive connection.

19. In a corn-harvesting machine, the combination with a framework, of a central partition, front and rear transverse shafts journaled on said framework, corresponding sprocket-wheels carried by the shafts, ground-wheels, a stalk and shock carrying apron on each side of said partition and composed of endless chain belts running over the sprocket-wheels, a cutting device in front of each of said carrying-aprons, a transverse shaft, connections for imparting rotary motion to the shaft from the ground-wheels, and connections between said shaft and one of the front and rear shafts whereby either a slow or rapid motion may be imparted to the latter.

20. The combination with a wheeled frame, of cutting apparatus, fingered feed-chains inclined upwardly and rearwardly to the cutting apparatus, a delivery device leading rearwardly from the cutting apparatus, transverse drive-shaft in operative relation to the wheels of the frame, upwardly and forwardly inclined counter-shafts driven from the drive-shafts, sprocket-wheels upon the counter-shafts and engaging the fingered feed-chains, and operative connection between the drive-shaft and the delivery device.

21. The combination with a wheel-frame, of individual cutting devices located at opposite sides of the frame, fingered feed-chains inclined upwardly and rearwardly to the cutting devices, individual delivery devices leading rearwardly from the respective cutting devices and separated by a longitudinal interspace, a drive-shaft disposed transversely across the said interspace and in operative relation to the wheels of the frame, said shaft being located in the rear of the cutting devices, upwardly and forwardly inclined counter-shafts driven from the drive-shaft, sprocket-wheels upon the counter-shafts and engaging the fingered feed-chains, a drive connection located in the interspace between the delivery devices and conveying motion from the drive-shaft to the said delivery devices, and a hood bridging the interspace between the delivery devices and housing and protecting the drive connection.

22. In a corn-harvester, the combination with cutting means, of partitions rising above, projecting in front and disposed at opposite sides of the cutting means, and also provided with corresponding upwardly and rearwardly inclined longitudinal slots extending in front and rear of the cutting means, channel-irons fitted in said slots and terminating short of the opposite ends thereof, and endless feed devices working in said slots, one side of each of these devices running in the adjacent channel-iron.

DAVID BINNS.

Witnesses:
A. L. PHELPS,
C. H. JOHNSON.